United States Patent
Kinoshita et al.

[11] Patent Number: 6,132,328
[45] Date of Patent: Oct. 17, 2000

[54] LOAD CARRYING CORD AND POWER TRANSMISSION BELT INCORPORATING THE LOAD CARRYING CORD

[75] Inventors: Takashi Kinoshita, Takasago; Hitoshi Hasaka, Kobe, both of Japan

[73] Assignee: Mitsuboshi Belting Ltd., Kobe, Japan

[21] Appl. No.: 09/198,767

[22] Filed: Nov. 24, 1998

Related U.S. Application Data

[63] Continuation-in-part of application No. 08/828,666, Mar. 31, 1997.

[30] Foreign Application Priority Data

Nov. 25, 1997 [JP] Japan ..................... 9-340715

[51] Int. Cl.$^7$ .................. F16G 1/00; F16G 5/00
[52] U.S. Cl. .................. 474/260; 474/268; 474/262
[58] Field of Search ............. 474/237, 260, 474/263, 268, 205, 259, 249, 271; 442/364, 381; 428/98, 288, 295

[56] References Cited

U.S. PATENT DOCUMENTS

| | | | |
|---|---|---|---|
| 3,929,180 | 12/1975 | Kawase et al. | 152/359 |
| 5,116,286 | 5/1992 | Kinoshita et al. | 474/237 |
| 5,492,507 | 2/1996 | Kumazaki | 474/205 |
| 5,658,655 | 8/1997 | Stanhope | 474/238 X |
| 5,802,839 | 9/1998 | Van Hook | 474/268 X |

FOREIGN PATENT DOCUMENTS

| | | |
|---|---|---|
| 50-16739 | 2/1975 | Japan . |
| 1904021 | 7/1992 | Japan . |
| 5-312237 | 11/1993 | Japan . |
| 7-127690 | 5/1995 | Japan . |
| 0169940 | 7/1996 | Japan . |
| 9030210 | 2/1997 | Japan . |

*Primary Examiner*—Lenard A. Footland
*Assistant Examiner*—Marcus Charles
*Attorney, Agent, or Firm*—Wood, Phillips, VanSanten, Clark & Mortimer

[57] ABSTRACT

A load carrying cord for a power transmission belt. The load carrying cord has a plurality of strands made up of fiber filaments of ethylene-2,6-naphthalate. Each strand has a denier of 500 to 1500. The fiber filaments in each strand are first-twisted in a first direction. The plurality of strands are combined by final-twisting in a second direction oppositely to the first direction. The resulting load carrying cord has a denier of 3,000 to 10,000.

18 Claims, 2 Drawing Sheets

LOAD CARRYING CORD AND POWER TRANSMISSION BELT INCORPORATING THE LOAD CARRYING CORD

CROSS REFERENCE

This application is a continuation-in-part of Ser. No. 08/828,666, entitled "V-Ribbed Power Transmission Belt", filed Mar. 31, 1997, the disclosure of which is incorporated herein by reference.

BACKGROUND OF THE INVENTION

1. Field of the Invention

This invention relates to load carrying cords as used as a component of a power transmission belt. The invention also relates to a power transmission belt incorporating the load carrying cord.

2. Background Art

A conventional power transmission belt has a body with a tension section and a compression section, with their being a neutral axis defined between the tension and compression sections by load carrying cords extending lengthwise of the body. Commonly, a cushion rubber layer is provided within which the load carrying cords are embedded. In one known construction, a V-ribbed belt is formed by embedding load carrying cords in a cushion rubber layer to which a cover canvas layer may be laminated. Multiple ribs are formed in the compression section. This type of belt is commonly used in the automotive environment, as an alternative to a V-belt, to drive components such as air conditioners, alternators, etc.

Typically, the load carrying cords in this type of V-belt/V-ribbed belt are made from polyethylene terephthalate (PET) fibers. PET fibers show better balance in terms of tenacity, modulus of elasticity, fatigue resistance, etc., than other fibers.

In the event that the heat shrinking stress of a belt is increased to avoid reduction in tension of the belt in operation, the dimensional stability of the belt may be reduced significantly over time.

To improve the dimensional stability over time, JP-A-50-16739 discloses a rubber reinforcing material, having good heat resistance and good dimensional stability, using polyethylene-2-6-naphthalate (PEN) fibers. However, bending fatigue is generally poorer with this type of fibers than with PET fibers.

JP-A-5-312237 discloses making the filament angle of the load carrying cords, made up of PEN fibers, from 15° to 25° to improve bending resistance. In JP-A-7-127690, a method of mixing and twisting PET filaments and PEN filaments is disclosed. However, with these cords, there is a problem that the modulus is lowered, a problem which is associated with load carrying cords using PEN fibers.

SUMMARY OF THE INVENTION

In one form, the invention is directed to a load carrying cord for a power transmission belt. The load carrying cord has a plurality of strands made up of fiber filaments of ethylene-2,6-naphthalate. Each strand has a denier of 500 to 1500. The fiber filaments in each strand are first-twisted in a first direction. The plurality of strands are combined by final-twisting in a second direction oppositely to the first direction. The resulting load carrying cord has a denier of 3,000 to 10,000.

The load carrying cords may be made from 5–8 strands.

The strands formed from the multiple filaments, combined in this manner, may contribute to the flexibility of the cord.

In one form, the filaments in each strand are first-twisted between 7–18/10 cm.

The plurality of strands may be final-twisted between 20–40/10 cm.

In one form, the ethylene-2-6-naphthalate is synthesized by polycondensing at least one of a) naphthalene-2,6-dicarboxylic acid and b) an ester-forming derivative of naphthelene-2,6-dicarboxylic acid and ethylene glycol in the presence of a catalyst.

The invention is also directed to a power transmission belt having a body with a length, an inside, an outside, and laterally spaced sides and having at least one rib extending along the length of the body, with the body further having a compression section, a tension section, and a load carrying cord between the inside and outside of the body, as described above, and extending in a lengthwise direction.

By combining the load carrying cord with other components to produce a power transmission belt, the residual tenacity, tenacity retention, and bending fatigue of the load carrying cord and belt, after belt running, may be improved over prior power transmission belt constructions.

Load carrying cords having good flexibility contribute to the overall flexibility of the power transmission belt of which they become part. The belts so constructed may be highly suitable for use in driving accessories in an automobile engine compartment, such as an air conditioner, alternator, etc.

The body may have a plurality of ribs extending along the length of the body.

Reinforcing fibers may be provided to extend laterally within the body.

In one form, the body is made at least partially from rubber and the rubber is at least one of a) hyrogenated nitrile rubber combined with a metal salt of an unsaturated carboxylic acid, b) chloroprene rubber, c) natural rubber, d) chlorosulfonated polyethylene (CSM), e) alkylated chlorosulfonated polyethylene (ACSM), f) styrene-butadiene rubber (SBR), and g) ethylene-α-olefin elastomer.

The fibers may be at least one of a) nylon 6, b) nylon 66, c) polyester, d) cotton, and e) aramid.

The at least one rib has laterally oppositely facing surfaces. In one form, the reinforcing fibers project outwardly from the body at the oppositely facing surfaces.

The load carrying cord may be treated with at least one of an epoxy compound and an isocyanate compound.

In one form, after the at least one of the epoxy compound and isocyanate compound is dried, the load carrying cord is treated with an RFL liquid.

At least one canvas layer may be provided on the body.

In one form, the compression section has a compression rubber layer and there is a cushion rubber layer outside of the compression rubber layer within which the load carrying cord is embedded.

DETAILED DESCRIPTION OF THE DRAWINGS

Figure 1:
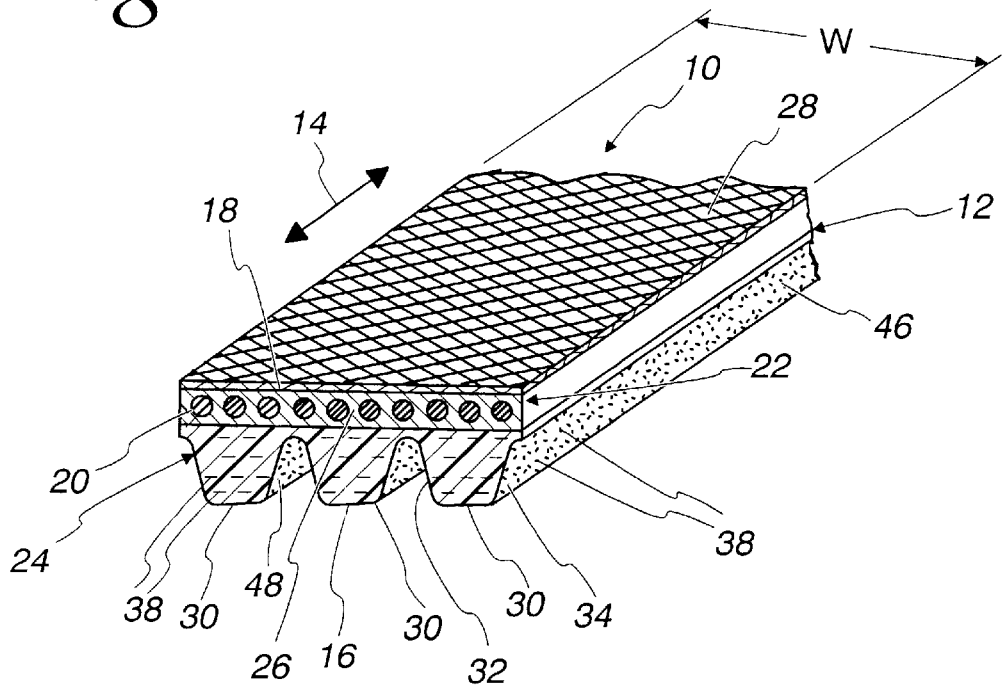
FIG. 1 is a fragmentary, cross-sectional, perspective view of a V-ribbed power transmission belt made according to the present invention.

One form of power transmission belt, made according to the present invention, is shown at 10 in FIG. 1. The power transmission belt 10 is a V-ribbed belt having a body 12 with a length, extending in the direction of the double-headed arrow 14, and a width W. The body 12 has an inside 16 and an outside 18.

Load carrying cords 20 are embedded in the body 12 and define a neutral axis. A tension section 22 is defined outside of the load carrying cords 20, with a compression section 24 defined inside of the load carrying cords 20. The load carrying cords 20 are embedded in a cushion rubber layer 26. A cover canvas layer 28 is applied to the outside 18 of the body 12. On the inside of the body, three V-shaped ribs 30 are formed in the compression section 24, with each rib 30 having laterally oppositely facing surfaces 32, 34 for engagement with a complementary surface on a pulley (not shown).

The portion of the compression section 24, within which the ribs 30 are formed, is made from at least one of a hydrogenated nitrile rubber, a hydrogenated nitrile rubber combined with a metal salt of an unsaturated carboxylic acid, chloroprene rubber, natural rubber, chlorosulfonated polyethylene (CSM), alkylated chlorosulfonated polyethylene (ACSM), styrene-butadiene rubber (SBR), and an ethylene-α-olefin elastomer. The hydrogenation ratio of the hydrogenated nitrile rubber is at least 80%, and preferably at least 90%, to exhibit good heat resistance and ozone resistance. If the hydrogenation ratio is less than 80%, heat resistance and ozone resistance may be lowered significantly. For good oil and cold resistance, acrylonitrile is preferably bonded in an amount in the range of 20–45%.

A suitable example of an ethylene-α-olefin elastomer is EPDM, which is a rubber made up of an ethylene-propylene-diene monomer. Examples of a diene monomer are dicyclopentadiene, methylene norbomene, ethylidene norbornene, 1,4-hexadiene, cyclooctadiene, etc. An ethylene-propylene-based rubber (EPR) can be used.

Individual fibers 38, made of nylon 6, nylon 66, polyester, cotton, or aramid, are provided in the ribs 30 to improve lateral pressure resistance. The fibers 38 project laterally from the ribs 30 to be exposed at the surfaces 32, 34. The fibers 38 exposed at the surfaces 32, 34 reduce the coefficient of friction between the surfaces 32, 34 and cooperating surfaces on a pulley (not shown). This reduces noise generation as the belt is operated. It is desirable to use aramid fibers 38 in conjunction with other fibers. Aramid fibers are rigid, have good tenacity, and also exhibit good corrosion resistance.

If aramid fibers 38 are used, the aramid fibers 38 have a length of 1–20 mm and are present in an amount of 1–30 parts by weight per 100 parts by weight of rubber. The aramid fibers 38 have an aromatic ring in their molecular structure. Aramid fibers 38, suitable for this purpose, are currently available and sold commercially under the trademarks CONEX™, NOMEX™, KVLAR™, TECHNORA™, TWARON™, etc.

If the amount of aramid fibers 38 is less than 1 part by weight, the rubber in the ribs 30 may become sticky and prone to abrasion. If the fibers 38 are present in an amount in excess of 30 parts by weight, the fibers 38 may not uniformly disperse in the rubber.

To improve adhesion between the fibers 38 and the rubber in which they are embedded, the fibers 38 are adhesive treated with at least one of an epoxy compound, an isocyanate compound, and an RFL liquid.

Figure 2:
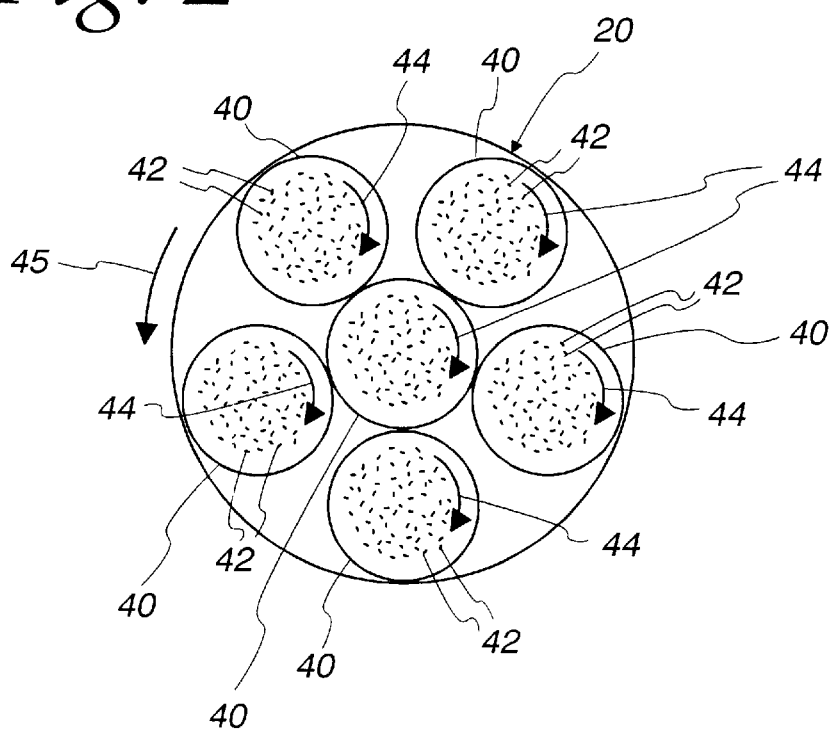
FIG. 2 is an enlarged, cross-sectional view of a load carrying cord on the power transmission belt in FIG. 1.

The load carrying cords 20 each preferably have a total denier of 3,000 to 10,000. Each load carrying cord 20 is made up of individual strands 40 each consisting of multiple fiber filaments 42. Each strand 40 has a denier of 500 to 1500. The fiber filaments 42 in the strands 40 are preferably polyester having ethylene-2,6-naphthalate as a main constituent. The fiber filaments 42 in each strand 40 are first-twisted in a first direction, as indicated by the arrows 44. Five to eight of the strands are then combined and final-twisted in a direction opposite to the first direction, as indicated by the arrow 45. The filaments 42 in each strand 40 are first-twisted between 7–18/10 cm. The strands 40 are in turn final-twisted between 20–40/10 cm. In FIG. 2, a load carrying cord 20 is shown having a 1×6 construction. One strand 40 is centrally located between five additional, surrounding strands 40.

If the total denier of the load carrying cords 20 is less than 3,000, the modulus and tenacity of the load carrying cords 20 become undesirably low. If the total denier exceeds 10,000, the thickness of the belt 10 increases, and bending fatigue may become a problem.

With the total denier of the load carrying cords 20 being the same, with a 1×N cord construction, if N is less than 5, the tenacity of the cord is high, but the residual tenacity and the tenacity retention of the cord, after running of the belt 10, tends to be lowered. If N exceeds 8, the tenacity of the cord 20 becomes lower, with the residual tenacity of the cord 20, after running of the belt, tending to be reduced.

Ethylene-2,6-naphthalate used in the present invention is synthesized by polycondensing naphthalene-2,6-dicarboxylic acid, or an ester-forming derivative thereof, and ethylene glycol in the presence of a catalyst under appropriate conditions. In this case, when one or more kinds of third components are added before finishing the polymerization of ethylene-2,6-naphthalate, a copolymer polyester is synthesized.

Adhesive treatment of the above-described load carrying cord 20 will now be described. The untreated cord 20 is immersed in a tank containing a treating liquid that is one of an epoxy compound and an isocyanate compound. The cord 20 is then dried by passing the cord 20 through a drying furnace at a temperature of 160–200° C. for from 30–600 seconds. The cord 20 is then immersed in a tank containing an adhesive liquid made of an RFL liquid. The cord 20 is then passed through a stretching, heat-fixing treatment apparatus at a temperature of from 210–260° C. for from 30–600 seconds to stretch the cord 20 to from −1% to 2% to provide a stretch-treated cord 20.

Suitable epoxy compounds are, for example, reaction products of polyhydric alcohols, such as ethylene glycol, glycerol, pentaerythritol, or the like, or polyalkylene glycols such as polyethylene glycol, or the like, and halogen-containing epoxy compounds such as epichlorohydrin, and reaction products of polyhydric phenols such as resorcinol, bis(4-hydroxyphenyl)dimethylmethane, a phenol-formaldehyde resin, a resorcinol-formalydehyde resin, and the like, and halogen-containing epoxy compounds. The epoxy compound is mixed with an organic solvent such as toluene, methyl ethyl ketone, and the like.

Examples of an isocyanate compound are 4,4'-diphenylmethane diisocyanate, toluene 2,4-diisocyanate, p-phenyl diisocyanate, polyaryl polyisocyanate, etc. The isocyanate compound may also be mixed with an organic solvent such as toluene, methyl ethyl ketone, and the like.

The RFL liquid is a mixture of an initial condensate of resorcinol and formalin and a latex. The latex used may be chloroprene, a styrene-butadiene-vinylpyridine terpolymer, hyrogenated nitrile, nitrile-butadiene rubber (NBR), etc.

The cord 20 resulting from the above treatment process can be incorporated into a belt to have a high modulus by making the spinning pitch, which is the winding pitch of the load carrying cord 20, from 0.8 to 1.3 mm. If the pitch is less than 0.8 mm, the cord 20 may run onto an adjacent cord 20 so that it cannot be wound properly. If the pitch exceeds 1.3 mm, the modulus of the belt may be gradually lowered.

The cover canvas layer 28 is formed by weaving yarns made up of cotton, polyamide, polyethylene teraphtbalate, and/or aramid fiber to a plain weave, twill elastic webbing, satin elastic webbing, etc.

With the V-ribbed belt 10, described above, the belt tenacity is from 1.20 to 1.30 kN/rib, with the belt residual tenacity at 0.8 to 0.95 kN/rib, and with the belt tenacity retention from 65 to 80%. Belt residual tenacity and the tenacity retention, after running, are high, with good bending fatigue characteristics.

If aramid fibers are used, the modulus of the belt can be increased. However, because the aramid fibers do not shrink when heated, an auto tensioner may become necessary. The need for an auto tensioner may increase the cost and increases the complexity of the transmission system in an automotive environment. Because the load carrying cords 20 use polyester fibers made up of ethylene-2,6-naphthalate as a main constituent, heat shrinkage result, which may obviate the need for an auto tensioner.

An example of one method of producing the V-ribbed belt 10 is as follows. One or more layers of cover canvas 28 are applied over a cylindrical drum, followed by a cushion rubber layer 26. Load carrying cords 20 are spirally wound thereover. A separate compression layer 46 is wound over the cords 20 to obtain a laminate sleeve, which is then vulcanized. The vulcanized sleeve is trained around a driving roller and a driven roller and run at a predetermined tension. A rotating grinding wheel is brought into contact with the moving sleeve to form from 3–100 grooves 48 in the compression layer 46.

The sleeve is then removed from the driving and driven rollers and trained around a separate driving roller and driven roller, driven around the rollers, and then cut to a desired width by a cutter to a predetermined belt width in which multiple ribs 30 are formed.

Figure 3:
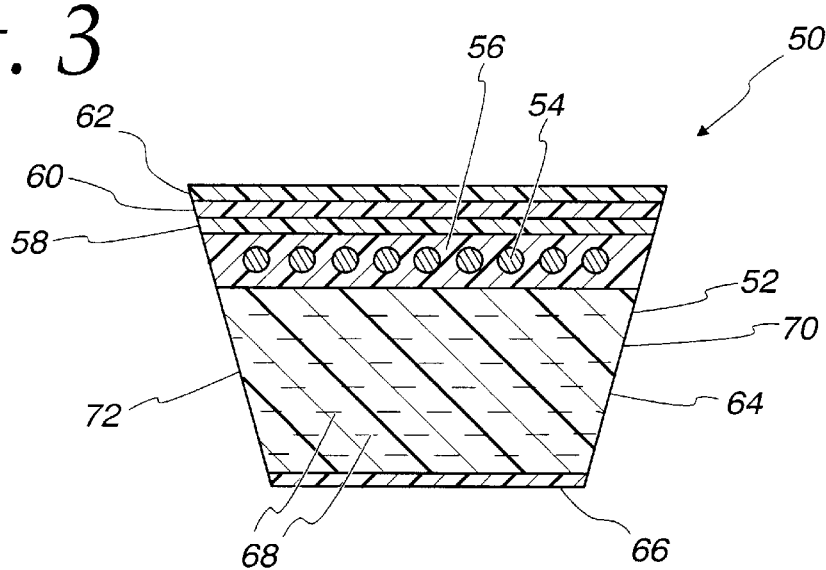
FIG. 3 is a cross-sectional view of a V-belt made according to the present invention.

The invention can also be used to construct a V-belt, as shown at 50 in FIG. 3. The belt 50 has a body 52 with load carrying cords 54 embedded in a cushion rubber layer 56. Three layers 58, 60, 62 of cover canvas are applied to the outside of the cushion rubber layer 56. A compression rubber layer 64 is applied to the inside of the cushion rubber layer 56 and has a cover canvas layer 66 applied at the inside thereof. Laterally extending, reinforcing fibers 68 are embedded in the compression rubber layer 64 and project from laterally oppositely facing, pulley-engaging side surfaces 70, 72. Cogs (not shown) may be provided at regular intervals along the length of the body 52.

Specific examples of the inventive belt, and the operation thereof, compared to conventional belts, will now be described.

INVENTIVE EXAMPLES 1–3 AND COMPARATIVE EXAMPLES 1–4

Load carrying cords, having the construction and twist number shown in Table 1, below, were made using ethylene-2,6-naphthalate (PEN) fibers of 600 denier, 750 denier, 1000 denier, 1200 denier, and 1500 denier, for each strand. Polyethylene terephthalate (PET) fibers of 1100 denier was used for one strand.

TABLE 1

|  | Inventive Example | | | Comparative Example | | | |
| --- | --- | --- | --- | --- | --- | --- | --- |
|  | 1 | 2 | 3 | 1 | 2 | 3 | 4 |
| Material | PEN | PEN | PEN | PEN | PEN | PEN | PEN |
| Construction | 1200 d/ 1 × 5 | 1000 d/ 1 × 6 | 750 d/ 1 × 8 | 1500 d/ 1 × 4 | 600 d/ 1 × 10 | 1000 d/ 2 × 3 | 1100 d/ 2 × 3 |
| First twisting No. | 11.4 | 11.4 | 11.4 | 11.4 | 11.4 | 11.4 | 11.4 |
| Final Twisting No. (times/10 cm) | 26.5 | 29.1 | 33.6 | 23.7 | 37.5 | 21.0 | 21.0 |
| Treating Temperature (° C.) | 230 | 230 | 230 | 230 | 230 | 230 | 230 |
| Stretching ratio (%) | 1.0 | 1.0 | 1.0 | 1.0 | 1.0 | 1.0 | 2.5 |
| Belt intermediate ductility (%) | 0.6 | 0.6 | 0.6 | 0.6 | 0.6 | 0.6 | 1.1 |
| Belt cutting ductility (%) | 5.5 | 5.5 | 5.5 | 5.5 | 5.5 | 5.5 | 11.0 |
| Belt tenacity (kN/rib) | 1.28 | 1.27 | 1.22 | 1.28 | 1.00 | 1.29 | 1.18 |
| Belt residual tenacity (kN/rib) | 0.85 | 0.93 | 0.93 | 0.65 | 0.78 | 0.49 | 1.07 |
| Belt tenacity retention (%) | 66 | 73 | 77 | 51 | 78 | 38 | 91 |

Each of the untreated cords was pre-dipped with an adhesive made up of 90 g of toluene and 10 g of PAPI (a polyisocyanate compound made by Kasei Upjohn Limited). Each cord was thereafter dried by passing the cord through a drying furnace maintained at a temperature from 170° to 190° C. for from 10–300 seconds. Each cord was then impregnated with an adhesive made up of 100 parts by weight of an RFL liquid (100 parts by weight of a chloroprene latex, 14.6 parts by weight of resorcinol, 9.2 parts by weight of formalin, 1.5 parts by weight of sodium hydroxide, and 262.5 parts by weight of water) and subjected to a heat-stretching fixing treatment at the treatment conditions shown in Table 1.

Using each of the above described cords, V-ribbed belts (3PK1100) were prepared. The manner of producing each belt was as follows.

A cylindrical mold was used around which one ply of rubber impregnated canvas was applied. The canvas was prepared by frictionally treating a plain woven fabric, made up of a cotton warp and weft, with a chloroprene rubber. A cushion rubber layer, made of chloroprene rubber as shown in Table 2, was wound therearound.

TABLE 2

| Rubber Composition | Weight Parts |
| --- | --- |
| Chloroprene rubber | 100 |
| Magnesia | 4 |
| Zinc white | 15 |
| Vulcanization accelerator | 2 |
| Sulfur | 0.5 |
| Antioxidant | 2 |
| Carbon Black | 65 |
| Oil | 8 |

The load carrying cords were then spirally wound around the cushion rubber layer, followed by the application of a compression rubber layer, made up of the chloroprene rubber composition shown in Table 2. The resulting laminate was vulcanized using a conventional method at 160° C. for 30 minutes to obtain a cylindrical, vulcanized sleeve.

The vulcanized sleeve was mounted on a driving roller and a driven roller with a predetermined tension applied thereto. The driven roller was operated to advance the sleeve. A rotating grinding wheel was used to cut the exposed surface of the vulcanized sleeve. The grinding wheel had a cutting surface with diamonds of 150 mesh thereon and was rotated at 1600 rpm. After the vulcanized sleeve was ground, it was removed from the driving and driven rollers and rotated on a separate assembly and cut to a predetermined width to produce individual belts.

In these V-ribbed belts, load carrying cords, each made up of the stretched fix-treated cords, were embedded in the cushion rubber layers. One ply of rubber impregnated cotton canvas was laminated on the upper side of the belt bodies. The compression sections of the belts were formed to define three ribs, extending lengthwise of each belt body. The V-ribbed belts produced were a K-type, three rib belt having a length of 1100 mm, by the RMA standard, with a rib pitch of 3.56 mm, a rib height of 2.0 mm, a rib angle of 40°, and a belt thickness of 4.3 mm.

The compression rubber and cushion rubber were both prepared from the rubber composition shown in Table 2. After kneading in a Banbury mixer, the mixture was rolled by a calender. The compression layers contained individual short fibers extending widthwise of the belt. The fibers were pre-treated with the above-described RFL liquid.

The static and dynamic performance of each V-ribbed belt, as described above, were evaluated. The results are described in Table 1.

Figure 4:
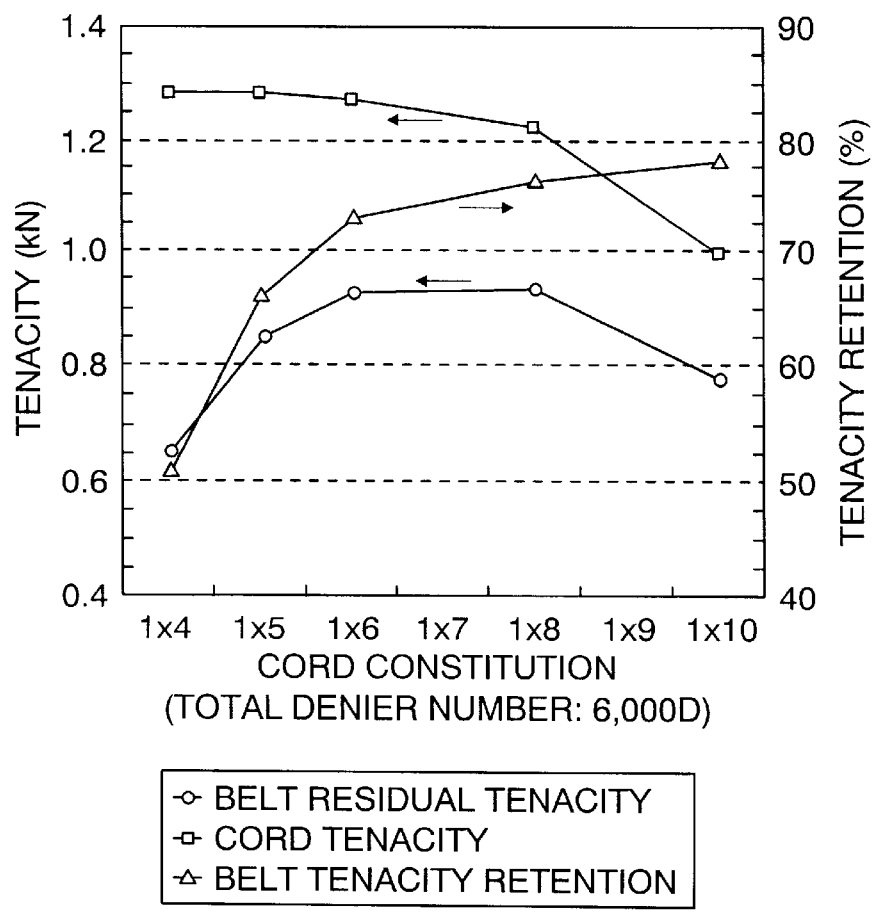
FIG. 4 is a graph showing the relationship between the constitution of cords made with PEN fibers and each of a) cord tenacity, b) belt residual tenacity, and c) belt tenacity retention.

In FIG. 4, the relationship between the cord constitution (with a total denier of 6,000) of the PEN fibers, and the cord tenacity, the belt residual tenacity, and the belt tenacity retention is shown.

The belts were tested as follows.

BELT INTERMEDIATE DUCTILITY

Each belt was pulled at a rate of 50 mm/minute and the elongation percentage with a stress of 245 N per rib was measured.

BELT CUTTING DUCTILITY

Each belt was pulled at a rate of 50 mm/minute and the elongation percentage when the belt was cut was measured.

BELT/CORD TENACITY

Each belt (cord) was pulled at a rate of 50 mm/minute. This value was obtained by dividing the maximum load, at which the belt (cord) was cut, by the rib number.

BELT RESIDUAL TENACITY

Each belt was trained on pulleys on a testing machine having a driving pulley with a diameter of 120 mm, a first driven pulley having a diameter of 120 mm, and a second driven pulley having a diameter of 45 mm. A load of 102 kgf was applied to the first driven pulley to produce tension on the belt. The driving pulley was rotated at 4800 rpm at a room temperature atmosphere. After running the belt for 1000 hours, the belt tenacity was measured, as described above.

BELT TENACITY RETENTION

This value was obtained by dividing the belt residual tenacity by the belt tenacity.

As can be seen above, by first-twisting a polyester fiber filament group having ethylene-2,6-naphthalate as a main constituent to form a strand, and final-twisting from 5–8 such strands oppositely to the direction of the first twisting, the cord residual tenacity and tenacity retention, after belt running, were increased. Bending fatigue can be improved significantly. When the first-twisting number is less than 5, the improvement in bending fatigue is lower. When the first-twisting number exceeds 8, the arrangement of each strand is unsatisfactory, and the initial tenacity becomes low.

The foregoing disclosure of specific embodiments is intended to be illustrative of the broad concepts comprehended by the invention.

What is claimed is:

1. A load carrying cord for a power transmission belt, said load carrying cord comprising:

a plurality of strands made up of fiber filaments comprising ethylene-2,6-naphthalate, each strand having a denier of 500–1500, the fiber filaments in each strand being first-twisted in a first direction, the plurality of strands being combined by final-twisting in a second direction oppositely to the first direction, wherein the load carrying cord comprises 5–8 strands and has a denier of from 3,000–10,000.

2. The load carrying cord for a power transmission belt according to claim 1 wherein the fiber filaments in each strand are first-twisted between 7–18/10 cm.

3. The load carrying cord for a power transmission belt according to claim 1 wherein the plurality of strands are final-twisted between 20–40/10 cm.

4. The load carrying cord for a power transmission belt according to claim 1 in combination with a rubber layer that is part of a power transmission belt and the load carrying cord is embedded in the rubber layer.

5. A load carrying cord for a power transmission belt, said load carrying cord comprising:

a plurality of strands made up of fiber filaments comprising ethylene-2,6-naphthalate, each strand having a denier of 500–1500, the fiber filaments in each strand being first-twisted in a first direction, the plurality of strands being combined by final-twisting in a second direction oppositely to the first direction, wherein the load carrying cord has a denier of from 3,000–10,000, wherein the load carrying cord comprises 5–8 strands, wherein the ethylene-2,6-naphthalate is synthesized by polycondensing at least one of a) naphthalene-2,6-dicarboxylic acid and b) an ester-forming derivative of naphthalene-2,6-dicarboxylic acid and ethylene glycol in the presence of a catalyst.

6. A power transmission belt comprising:

a body having a length, an inside, an outside, and laterally spaced sides and comprising at least one rib extending along the length of the body, said body further comprising a compression section, a tension section, and a load carrying cord between the inside and outside of the body and extending along the length of the body, said load carrying cord comprising a plurality of strands made up of fiber filaments comprising ethylene-2,6-naphthalate, each strand having a denier of 500–1500, the fiber filaments in each strand being first-twisted in a first direction, the plurality of strands being combined by final-twisting in a second direction oppositely to the first direction, wherein the load carrying cord comprises 5–8 strands and has a denier of from 3,000–10,000.

7. The power transmission belt according to claim 6 wherein the fiber filaments in each strand are first-twisted between 7–18/10 cm.

8. The power transmission belt according to claim 6 wherein the plurality of strands are final-twisted between 20–40/10 cm.

9. The power transmission belt according to claim 6 wherein the body comprises a plurality of ribs extending along the length of the body.

10. The power transmission belt according to claim 6 further comprising a plurality of reinforcing fibers extending laterally within the body.

11. The power transmission belt according to claim 6 wherein the body is made at least partially from rubber and the rubber comprises at least one of a) hydrogenated nitrile rubber combined with a metal salt of an unsaturated carboxylic acid, b) chloroprene rubber, c) natural rubber, d) chlorosulfonated polyethylene (CSM), e) alkylated chlorosulfonated polyethylene (ACSM), f) styrene-butadiene rubber (SBR), and g) ethylene-α-olefin elastomer.

12. The power transmission belt according to claim 10 wherein the fibers comprises at least one of a) nylon 6, b) nylon 66, c) polyester, d) cotton and e) aramid.

13. The power transmission belt according to claim 10 wherein the at least one rib has laterally oppositely facing surfaces and the reinforcing fibers project outwardly from the body at the laterally oppositely facing surfaces.

14. The power transmission belt according to claim 6 wherein the load carrying cord is treated with at least one of an epoxy compound and an isocyanate compound.

15. The power transmission belt according to claim 14 wherein after the at least one of the epoxy compound and isocyanate compound is dried, the load carrying cord is treated with an RFL liquid.

16. The power transmission belt according to claim 6 further comprising at least one canvas layer on the body.

17. The power transmission belt according to claim 6 wherein the compression section comprises a compression rubber layer, there is a cushion rubber layer outside of the compression rubber layer, and the load carrying cord is embedded in the cushion rubber layer.

18. A power transmission belt comprising:

a body having a length, an inside, an outside, and laterally spaced sides and comprising at least one rib extending along the length of the body, said body further comprising a compression section, a tension section, and a load carrying cord between the inside and outside of the body and extending along the length of the body, said load carrying cord comprising a plurality of strands made up of fiber filaments comprising ethylene-2,6-naphthalate, each strand having a denier of 500–1500, the fiber filaments in each strand being first-twisted in a first direction, the plurality of strands being combined by final-twisting in a second direction oppositely to the first direction, wherein the load carrying cord has a denier of from 3,000–10,000, wherein the load carrying cord comprises 5–8 strands, wherein the ethylene-2,6-naphthalate is synthesized by polycondensing at least one of a) naphthalene-2,6-dicarboxylic acid and b) an ester-forming derivative of naphthalene-2,6-dicarboxylic acid and ethylene glycol in the presence of a catalyst.

* * * * *